United States Patent
Chang et al.

(10) Patent No.: US 12,269,340 B2
(45) Date of Patent: Apr. 8, 2025

(54) MULTI-PERSPECTIVE THREE-DIMENSIONAL FLOATING IMAGE DISPLAY WITH POLARIZATION MULTIPLEXING

(71) Applicant: GM Global Technology Operations LLC, Detroit, MI (US)

(72) Inventors: Kai-Han Chang, Sterling Heights, MI (US); Manoj Sharma, Troy, MI (US); Thomas A. Seder, Fraser, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 553 days.

(21) Appl. No.: 17/842,253

(22) Filed: Jun. 16, 2022

(65) Prior Publication Data
US 2023/0406099 A1   Dec. 21, 2023

(51) Int. Cl.
*B60K 35/00* (2024.01)
*G02B 27/28* (2006.01)
*B60K 35/21* (2024.01)
*B60K 35/60* (2024.01)

(52) U.S. Cl.
CPC ............ *B60K 35/00* (2013.01); *G02B 27/283* (2013.01); *B60K 35/211* (2024.01); *B60K 35/60* (2024.01); *B60K 2360/23* (2024.01); *B60K 2360/29* (2024.01); *B60K 2360/771* (2024.01); *B60Y 2200/11* (2013.01)

(58) Field of Classification Search
CPC ........................... B60K 35/00; B60K 2360/00; B60Y 2200/00; G02B 27/283
USPC .............................................................. 359/1
See application file for complete search history.

(56) References Cited

U.S. PATENT DOCUMENTS

| | | | |
|---|---|---|---|
| 10,318,043 | B2 | 6/2019 | Seder et al. |
| 11,077,844 | B2 | 8/2021 | Szczerba |
| 2010/0046050 | A1 | 2/2010 | Kroll et al. |
| 2017/0322513 | A1 | 11/2017 | Zapanta |
| 2018/0147985 | A1 | 5/2018 | Brown et al. |
| 2019/0243151 | A1 | 8/2019 | Hansen |
| 2021/0023948 | A1 | 1/2021 | Knittl et al. |

(Continued)

OTHER PUBLICATIONS

U.S. Appl. No. 17/824,210, filed May 25, 2022, pp. 67-88.
U.S. Appl. No. 17/746,243, filed May 17, 2022, pp. 18-35.

*Primary Examiner* — Wyatt A Stoffa
*Assistant Examiner* — Grant A Gagnon
(74) *Attorney, Agent, or Firm* — Vivacqua Crane, PLLC

(57) ABSTRACT

A system for generating an image for passengers in a vehicle includes a display adapted to project an image, a polarization rotator actuatable to rotate the polarization of an image to one of S-polarization and P-polarization, a reflector unit adapted to reflect S-polarized images to a first beam splitter, and to reflect P-polarized images to a second beam splitter, each of the first and second beam splitters adapted to receive an image and to reflect the image to an associated passenger, and a controller in communication with the display and the polarization rotator, the controller adapted to simultaneously actuate the display to alternate between projecting a first image and a second image, actuate the polarization rotator to alternate between rotating the polarization of an image to S-polarization and P-polarization, and synchronize the display and the polarization rotator.

20 Claims, 4 Drawing Sheets

(56) References Cited

U.S. PATENT DOCUMENTS

2023/0039608 A1    2/2023   Ji et al.
2023/0375829 A1    11/2023   Seder et al.

MULTI-PERSPECTIVE THREE-DIMENSIONAL FLOATING IMAGE DISPLAY WITH POLARIZATION MULTIPLEXING

INTRODUCTION

The present disclosure relates to a system for generating a floating image viewable by a plurality of passengers within a vehicle.

Current entertainment systems within vehicles generally comprise a screen or monitor that is mounted within the vehicle for viewing by the passengers. Some systems include smaller individual screens, wherein each passenger has a screen for their personal viewing.

While current systems achieve their intended purpose, there is a need for a new and improved system for providing a floating three-dimensional image that appears centrally located within the vehicle to all the passengers within the vehicle.

SUMMARY

According to several aspects of the present disclosure, a system for generating a centrally located floating three-dimensional image display for a plurality of passengers positioned within a vehicle, includes a display adapted to project a multiplexed image comprising a plurality of three-dimensional images, a polarization rotator positioned immediately in front of the display, the polarization rotator selectably actuatable to rotate the polarization of an image projected from the display through the polarization rotator to one of S-polarization and P-polarization, a reflector unit adapted to reflect S-polarized images to at least one first beam splitter, and further adapted to reflect P-polarized images to at least one second beam splitter, each of the at least one first beam splitter and the at least one second beam splitter individually associated with one of the plurality of passengers, and adapted to receive one of the plurality of images from the display and to reflect the one of the plurality of images to the associated one of the plurality of passengers, wherein, each of the plurality of passengers perceives one of the plurality of three-dimensional images floating at a central location within the vehicle, and a controller in communication with the display and the polarization rotator, the controller adapted to simultaneously actuate the display to alternate between projecting a first image and projecting a second image, actuate the polarization rotator to alternate the polarization of the image projected from the display between S-polarization and P-polarization, and synchronize the display and the polarization rotator such that when the display is projecting the first image, the polarization rotator rotates the polarization of the first image to S-polarization, and when the display is projecting the second image, the polarization rotator rotates the polarization of the second image to P-polarization.

According to another aspect, the plurality of three-dimensional images are generated via a holographic method, pre-computed and encoded into a hologram generator within the display.

According to another aspect, the reflector unit includes a polarized beam splitter immediately downstream of the polarization rotator, the polarized beam splitter adapted to reflect S-polarized images to the at least one first beam splitter and to allow P-polarized images to pass through the polarized beam splitter.

According to another aspect, the reflector unit includes a first mirror immediately downstream of the polarized beam splitter, the first mirror adapted to reflect P-polarized images that pass through the polarized beam splitter to the at least one second beam splitter.

According to another aspect, the first mirror includes a filter adapted to rotate the polarization of the second image to S-polarization.

According to another aspect, the system further includes a second mirror positioned between the polarized beam splitter and the at least one first beam splitter and adapted to reflect the first image from the polarized beam splitter to the at least one first beam splitter.

According to another aspect, the system further includes a third mirror positioned between the first mirror and the at least one second beam splitter and adapted to reflect the second image from the first mirror to the at least one second beam splitter.

According to another aspect, the first image includes a first sub-image region and a second sub-image region and the at least one first beam splitter includes a plurality of first beam splitters, wherein a first portion of the plurality of first beam splitters are aligned with the first sub-image region of the first image and reflect a first sub-image to passengers associated with the first portion of the plurality of first beam splitters, and a second portion of the plurality of first beam splitters are aligned with the second sub-image region of the first image and reflect a second sub-image to passengers associated with the second portion of the plurality of first beam splitters.

According to another aspect, the second image includes a third sub-image region and a fourth sub-image region and the at least one second beam splitter includes a plurality of second beam splitters, wherein a first portion of the plurality of second beam splitters are aligned with the third sub-image region of the second image and reflect a third sub-image to passengers associated with the first portion of the plurality of second beam splitters, and a second portion of the plurality of second beam splitters are aligned with the fourth sub-image region of the second image and reflect a fourth sub-image to passengers associated with the second portion of the plurality of second beam splitters.

According to another aspect, the display and the reflector unit are mounted to a roof within the vehicle.

According to another aspect, each of the at least one first beam splitter and the at least one second beam splitter is transparent, wherein a passenger can see through each of the at least one first beam splitter and the at least one second beam splitter.

According to another aspect, each of the at least one first beam splitter and the at least one second beam splitter hangs from a roof of the vehicle.

According to another aspect, each of the at least one first beam splitter and the at least one second beam splitter is supported from a floor of the vehicle.

According to another aspect, each of the at least one first beam splitter and the at least one second beam splitter is supported from an armrest within the vehicle.

According to another aspect, an orientation of each of the at least one first beam splitter and the at least one second beam splitter is fixed.

According to another aspect, an orientation of each of the at least one first beam splitter and the at least one second beam splitter is adjustable.

According to another aspect, each of the at least one first beam splitter and the at least one second beam splitter has a flat profile.

According to another aspect, each of the at least one first beam splitter and the at least one second beam splitter has a curved profile.

According to several aspects of the present disclosure, a system for generating a centrally located floating three-dimensional image display for a plurality of passengers positioned within a vehicle includes a display mounted to a roof within the vehicle and adapted to project a multiplexed image comprising a plurality of three-dimensional images, a polarization rotator positioned immediately in front of the display, the polarization rotator selectably actuatable to rotate a polarization of an image projected from the display through the polarization rotator to one of S-polarization and P-polarization, a reflector unit mounted to the roof within the vehicle and including a polarized beam splitter immediately downstream of the polarization rotator, the polarized beam splitter adapted to reflect S-polarized images to at least one transparent first beam splitter and to allow P-polarized image to pass through the polarized beam splitter, and a first mirror immediately downstream of the polarized beam splitter, the first mirror adapted to reflect P-polarized images that pass through the polarized beam splitter to at least one transparent second beam splitter, the first mirror including a filter adapted to rotate the polarization of the second image to S-polarization, wherein, each of the at least one first beam splitter and the at least one second beam splitter individually associated with one of the plurality of passengers, and adapted to receive one of the plurality of images from the display and to reflect the one of the plurality of images to the associated one of the plurality of passengers, wherein, each of the plurality of passengers perceives one of the plurality of three-dimensional images floating at a central location within the vehicle, a second mirror positioned between the polarized beam splitter and the at least one first beam splitter and adapted to reflect the first image from the polarized beam splitter to the at least one first beam splitter, a third mirror positioned between the first mirror and the at least one second beam splitter and adapted to reflect the second image from the first mirror to the at least one second beam splitter, and a controller in communication with the display and the polarization rotator, the controller adapted to simultaneously actuate the display to alternate between projecting a first image and projecting a second image, actuate the polarization rotator to alternate the polarization of the image projected from the display through the polarization rotator between S-polarization and P-polarization, and synchronize the display and the polarization rotator such that when the display is projecting the first image, the polarization rotator rotates the polarization of the first image to S-polarization, and when the display is projecting the second image, the polarization rotator rotates the polarization of the second image to P-polarization.

According to another aspect, the first image includes a first sub-image region and a second sub-image region and the at least one first beam splitter includes a plurality of first beam splitters, wherein a first portion of the plurality of first beam splitters are aligned with the first sub-image region of the first image and reflect a first sub-image to passengers associated with the first portion of the plurality of first beam splitters, and a second portion of the plurality of first beam splitters are aligned with the second sub-image region of the first image and reflect a second sub-image to passengers associated with the second portion of the plurality of first beam splitters, and the second image includes a third sub-image region and a fourth sub-image region and the at least one second beam splitter includes a plurality of second beam splitters, wherein a first portion of the plurality of second beam splitters are aligned with the third sub-image region of the second image and reflect a third sub-image to passengers associated with the first portion of the plurality of second beam splitters, and a second portion of the plurality of second beam splitters are aligned with the fourth sub-image region of the second image and reflect a fourth sub-image to passengers associated with the second portion of the plurality of second beam splitters.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
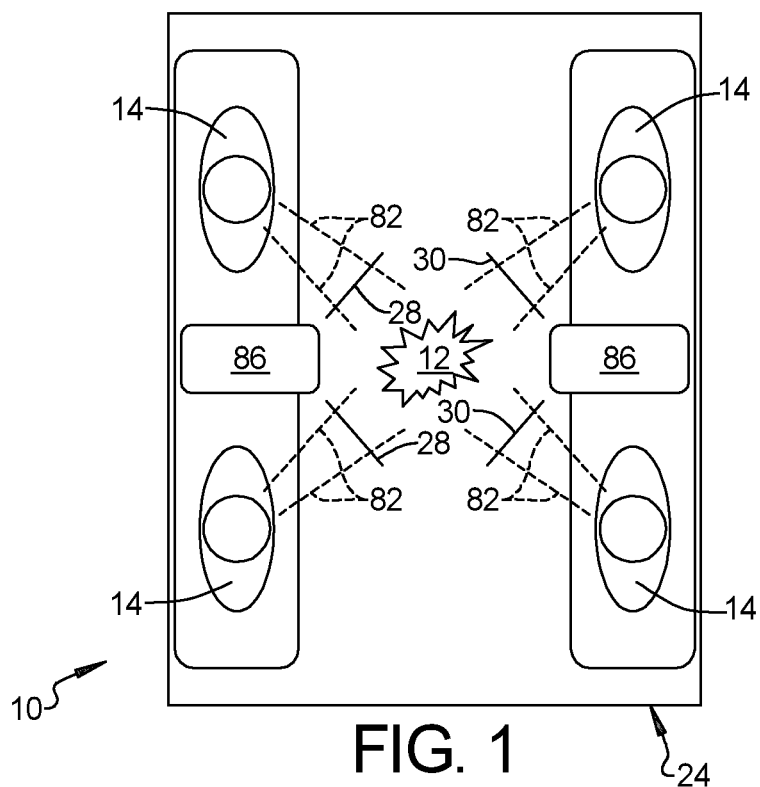
FIG. 1 is a schematic top view of a vehicle compartment having a system in accordance with an exemplary embodiment of the present disclosure.

The figures are not necessarily to scale, and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 2:
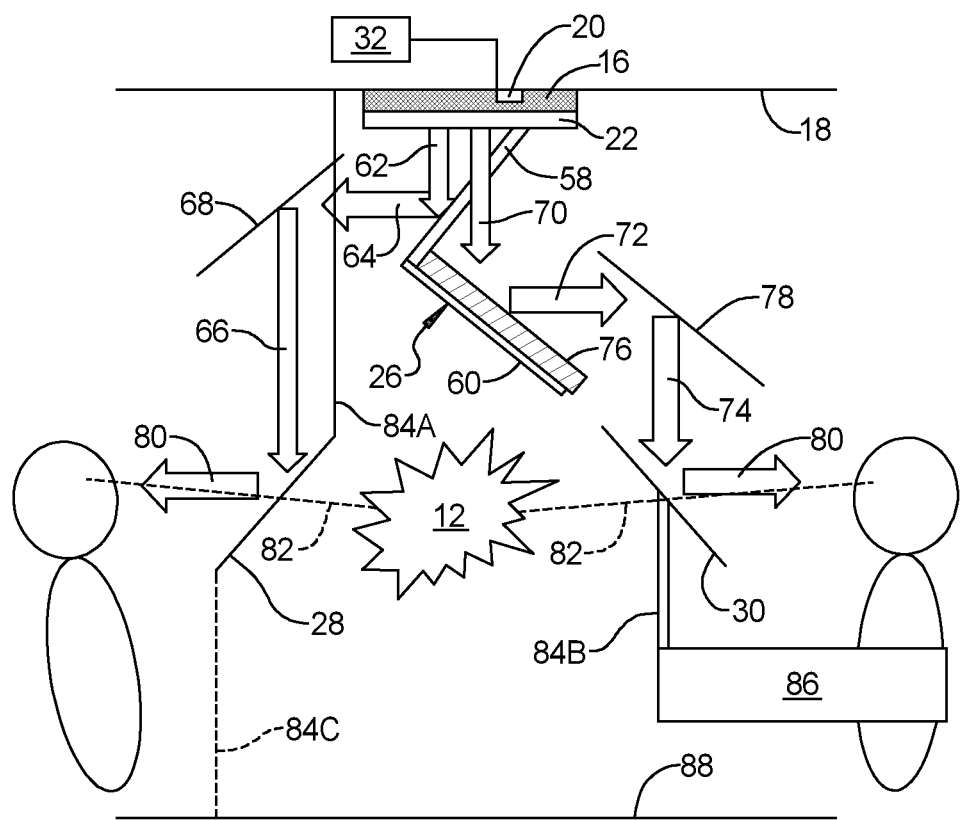
FIG. 2 is a schematic side view of two passengers within a vehicle compartment having a system according to an exemplary embodiment, wherein the display is mounted onto a roof of the vehicle compartment.

Referring to FIG. 1 and FIG. 2, a system 10 for generating a centrally located floating image 12 display for a plurality of passengers 14 positioned within a vehicle, includes a display 16 that is mounted to a roof 18 within the vehicle and is adapted to project a plurality of three-dimensional images. In an exemplary embodiment, the plurality of three-dimensional images are generated via holographic method, precomputed and encoded into a hologram generator 20 within the display 16. A polarization rotator 22 is positioned immediately in front of the display 16. The polarization rotator 22 is selectably actuatable to rotate the polarization of light of an image projected from the display 16 through the polarization rotator 22 to one of S-polarization and P-polarization. Light is an electromagnetic wave, and the electric field of this wave oscillates perpendicularly to the direction of propagation. Light is called unpolarized if the direction of this electric field fluctuates randomly in time. Many common light sources such as sunlight, halogen lighting, LED spotlights, and incandescent bulbs produce unpolarized light. If the direction of the electric field of light is well defined, it is called polarized light. The two orthogonal linear polarization states that are most important for reflection and transmission are referred to as p-polarization and s-polarization. P-polarized light has an electric field polarized parallel to the plane of incidence, while s-polarized light is perpendicular to this plane.

Referring to FIG. 1, in an exemplary embodiment, a vehicle compartment 24 includes a plurality of seating positions occupied by a plurality of passengers 14. A reflector unit 26, mounted to and hanging down from the roof 18 within the vehicle, is adapted to reflect S-polarized images from the reflector unit 26 to at least one first beam splitter 28, and is further adapted to reflect P-polarized images from the reflector unit 26 to at least one second beam splitter 30. Each of the at least one beam splitter 28 and each of the at least one second beam splitter 30 is adapted to be viewed by one of the passengers 14. As shown, the system 10 includes two first beam splitters 28 and two second beam splitters 30. One first beam splitter 28 is associated with a first passenger 114, one first beam splitter 28 is associated with a second passenger 214, one second beam splitter 30 is associated with a third passenger 314, and one second beam splitter 30 is associated with a fourth passenger 414.

The system 10 includes a controller 32 in communication with the display 16 and the polarization rotator 22. The controller 32 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The controller 32 is adapted to simultaneously actuate the display 16 to alternate between projecting a first image and projecting a second image, actuate the polarization rotator 22 to alternate the polarization of the image projected from the display 16 between S-polarization and P-polarization, and to synchronize the display 16 and the polarization rotator 22. When the display 16 is projecting the first image, the polarization rotator 22 rotates the polarization of the first image to S-polarization, and when the display 16 is projecting the second image, the polarization rotator 22 rotates the polarization of the second image to P-polarization.

Synchronization of the display 16 and the polarization rotator 22 enables time-based multiplexing of the first and second images. The display 16 will project the first image and actuate the polarization rotator 22 to rotate the polarization of the first image to S-polarization. After a first pre-determined time interval, for example 8 milliseconds, the controller 32 causes the display 16 to switch to projecting the second image, and simultaneously, actuates the polarization rotator 22 to rotate the polarization of the second image to P-polarization. After the pre-determined time interval, the controller causes the display to switch back to projecting the first image, and actuates the polarization rotator 22 to rotate the polarization of the first image to S-polarization. The controller continuously cycles the display 16 and the polarization rotator 22 in this manner.

Figure 3:
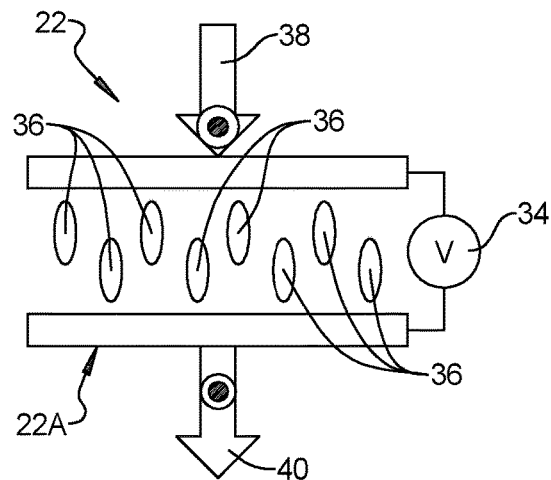
FIG. 3 is a schematic side view of a polarization rotator that comprises a twist nematic liquid crystal device, wherein the twist nematic liquid crystal device is actuated to rotate the polarization of light passing therethrough to S-polarization.
Figure 4:
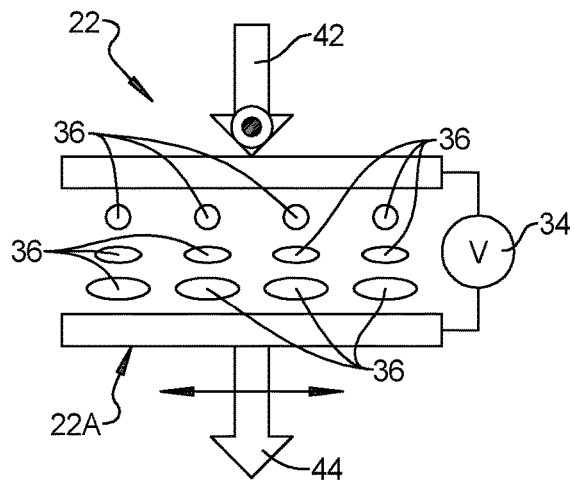
FIG. 4 is a schematic side view of a polarization rotator that comprises a twist nematic liquid crystal device, wherein the twist nematic liquid crystal device is actuated to rotate the polarization of light passing therethrough to P-polarization.

When the first and second images are projected by the display 16, each of the first and second images are polarized with S-polarization. The polarization rotator 22 may be any type of device or filter that rotates the polarization of light passing through it. In an exemplary embodiment, the polarization rotator 22 is a twist nematic liquid crystal device 22A. Referring to FIG. 3, when the twist nematic liquid crystal device 22A is actuated, by applying an electric voltage 34, liquid crystal molecules 36 within the twist nematic liquid crystal 22A orient such that S-polarized images entering the twist nematic liquid crystal device 22A, as indicated by arrow 38, are allowed to pass through the twist nematic liquid crystal device 22A and remain S-polarized as they exit the twist nematic liquid crystal 22A, as indicated by arrow 40. Referring to FIG. 4, when the electric voltage 34 is removed from the twist nematic liquid crystal device 22A, liquid crystal molecules 36 within the twist nematic liquid crystal device 22A orient such that S-polarized images entering the twist nematic liquid crystal device 22A, as indicated by arrow 42, are converted and exit the twist nematic liquid crystal device 22A, as indicated by arrow 44, with P-polarization.

Figure 5:
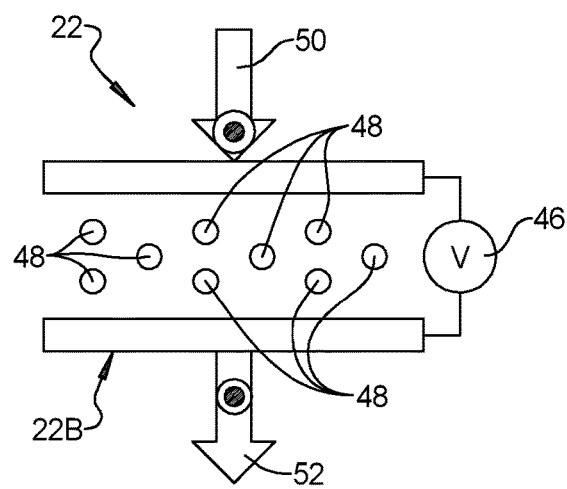
FIG. 5 is a schematic side view of a polarization rotator that comprises a ferroelectric liquid crystal device, wherein the ferroelectric liquid crystal device is actuated to rotate the polarization of light passing therethrough to S-polarization.
Figure 6:
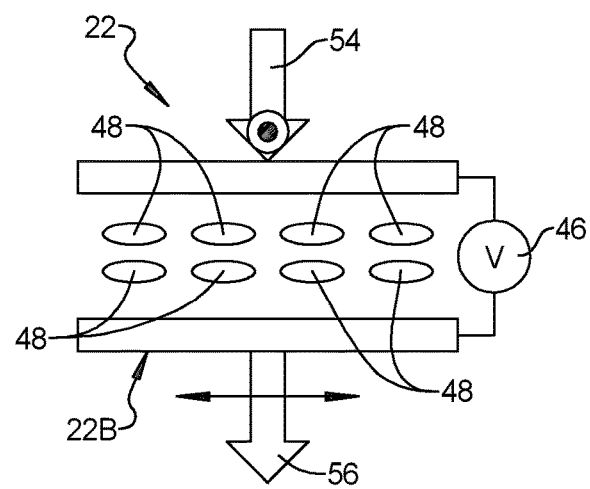
FIG. 6 is a schematic side view of a polarization rotator that comprises a ferroelectric liquid crystal device, wherein the ferroelectric liquid crystal device is actuated to rotate the polarization of light passing therethrough to P-polarization.

In another exemplary embodiment, the polarization rotator 22 is a ferroelectric liquid crystal device 22B. Referring to FIG. 5, when the ferroelectric liquid crystal device 22B is actuated, by applying an electric voltage 46, liquid crystal molecules 48 within the ferroelectric liquid crystal device 22B orient such that S-polarized images entering the ferroelectric liquid crystal device 22B, as indicated by arrow 50, are allowed to pass through the ferroelectric liquid crystal device 22B and remain S-polarized, as indicated by arrow 52. Referring to FIG. 6, when the electric voltage 46 is changed, the liquid crystal molecules 48 within the ferroelectric liquid crystal device 22B re-orient such that S-polarized images entering the ferroelectric liquid crystal device 22B, as indicated by arrow 54, are converted and exit the ferroelectric liquid crystal device 22B, as indicated by arrow 56, with P-polarization.

Referring to FIG. 2, in an exemplary embodiment, the reflector unit 26 includes a polarized beam splitter 58 and a first mirror 60. The polarized beam splitter 58 is positioned immediately downstream of the polarization rotator 22, and is adapted to receive the S-polarized first images, as indicated by arrow 62, and to reflect the first images to the at least one first beam splitter 28, as indicated by arrows 64 and 66. In an exemplary embodiment, the system includes a second mirror 68 positioned between the polarized beam splitter 58 and the at least one first beam splitter 28 that receives the S-polarized first images, as indicated by arrow 64, and reflects the S-polarized first images from the polarized beam splitter 58 to the at least one first beam splitter 28, as indicated by arrow 66.

The polarized beam splitter 58 is further adapted to receive P-polarized second images from the polarization rotator 22 and to allow the P-polarized second images to pass through the polarized beam splitter 58, as indicated by arrow 70. The first mirror 60 is positioned immediately downstream of the polarized beam splitter 58 and is adapted to reflect the second images that pass through the polarized beam splitter 58 to the at least one second beam splitter 30, as indicated by arrows 72 and 74.

In an exemplary embodiment, the first mirror 60 includes a filter 76 adapted to convert the P-polarized second images from the polarization rotator 22 to S-polarization. Converting the second images to S-polarization ensures proper reflection of the second images by the at least one second beam splitter 30. The system 10 includes a third mirror 78 that is positioned between the first mirror 60 and the at least one second beam splitter 30 and is adapted to receive the converted S-polarized second images from the first mirror 60, as indicated by arrow 72, and to reflect the S-polarized second images to the at least one second beam splitter 30, as indicated by arrow 74.

Each of the at least one first beam splitter 28 and the at least one second beam splitter 30 are individually associated with one of the plurality of passengers 14, and adapted to receive one of the plurality of images from the display 16 and to reflect the one of the plurality of images to the associated one of the plurality of passengers 14, as indicated by arrows 80, wherein, each of the plurality of passengers perceives one of the plurality of three-dimensional images floating at a central location within the vehicle, as indicated by lines 82. Each of the at least one first beam splitter 28 and the at least one second beam splitter 30 is transparent, wherein a passenger 14 can see through the at least one first beam splitter 28 and the at least one second beam splitter 30, as indicated by lines 82. This allows the passenger 14 to perceive the floating image 12 at a distance beyond the at least one first beam splitter 28 and the at least one second beam splitter 30 and further, allows the passenger 14 to see through the at least one first beam splitter 28 and the at least one second beam splitter 30 and able to see the interior of the vehicle compartment 20 and other passengers 14 therein.

In an exemplary embodiment, the display 16 is adapted to project a three-dimensional image with variable virtual image distance. Three-dimensional images with variable virtual image distance allows the system 10 to project a floating image 12 to the passenger 14 with the capability of making the floating image 12 appear closer or further away from the passenger 14.

In an exemplary embodiment, each of the at least one first beam splitter 28 and each of the at least one second beam splitter 30 is moveable between a retracted position and an extended position. In an exemplary embodiment, each of the at least one first beam splitter 28 and each of the at least one second beam splitter 30 is mounted onto a support shaft 84A that hangs down from the roof 18 of the vehicle compartment 20. As shown in FIG. 2, the at least one first beam splitter 28 hangs from the roof 18 on the support shaft 84A. In a retracted position, the at least one first beam splitter 28 and the at least one second beam splitter 30 is positioned adjacent to the display 16 and parallel to the roof 18 of the vehicle compartment 20. From the retracted position, each of the at least one first beam splitter 28 and the at least one second beam splitter 30 is pivoted down, and the support shaft 84A is extended downward to place the at least one first beam splitter 28 and the at least one second beam splitter 30 in an extended position for use. When in the extended position, the at least one first beam splitter 28 and the at least one second beam splitter 30 is in operational proximity to the display 16 and the passenger 14.

Each of the at least one first beam splitter 28 and the at least one second beam splitter 30 may also be mounted onto an armrest 86 next to the passenger 14. Referring again to FIG. 2, the at least one second beam splitter 30 is shown mounted onto the armrest 86 next to the passenger 14. The at least one second beam splitter 30 is attached to a support shaft 84B that is attached to the armrest 42. While not shown, the at least one second beam splitter 30 supported on the armrest 86 may also be moveable from a retracted position to an extended position. In one exemplary embodiment, the at least one second beam splitter 30 is stowable within the armrest 86 when in a retracted position.

Each of the at least one first beam splitter 28 and the at least one second beam splitter 30 may also be supported on a support shaft 84C extending upward from a floor 88 of the vehicle compartment 20. Referring again to FIG. 2, a support shaft 84C extending upward from the floor 88 of the vehicle is shown in shadow, wherein the at least one first beam splitter 28 is supported on the support shaft 84C. While not shown, the at least one first beam splitter 28 supported from the floor 88 of the vehicle compartment 20 may also be moveable from a retracted position to an extended position. In one exemplary embodiment, the at least one first beam splitter 28 is stowable within the floor 88 of the vehicle compartment 20 when in a retracted position.

Figure 7:
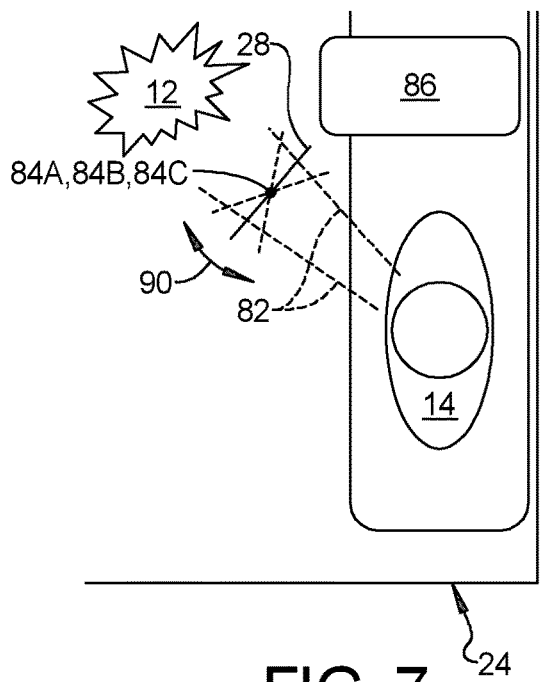
FIG. 7 is a schematic top view of a portion of a vehicle compartment including a beam splitter that is horizontally pivotal.
Figure 8:
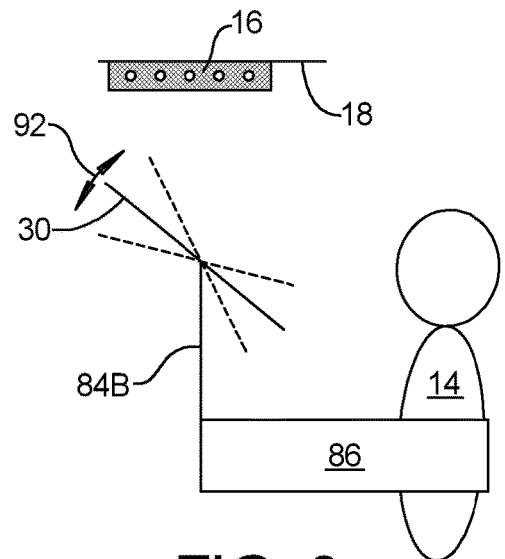
FIG. 8 is a schematic side view of a portion of a vehicle compartment including a beam splitter that is vertically pivotal.

In an exemplary embodiment, an orientation of each of the at least one first beam splitter 28 and the at least one second beam splitter 30 is fixed. Thus, when the at least one first beam splitter 28 and the at least one second beam splitter 30 are in the extended position angular orientation vertically and horizontally relative to the support shaft 84A, 84B, 84C is fixed. Alternatively, in another exemplary embodiment, an orientation of each of the at least one first beam splitter 28 and the at least one second beam splitter 30 is adjustable. Referring to FIG. 7, each of the at least one first beam splitter 28 and the at least one second beam splitter 30 is pivotally mounted onto the support shaft 84A, 84B, 84C wherein each of the at least one first beam splitter 28 and the at least one second beam splitter 30 is pivotal horizontally about an axis as shown by arrow 90. Referring to FIG. 8, each of the at least one first beam splitter 28 and the at least one second beam splitter 30 is pivotally mounted onto the support shaft 84A, 84B, 84C wherein each of the at least one first beam splitter 28 and the at least one second beam splitter 30 is vertically pivotal, as indicated by arrow 92. Adjustability of each of the at least one first beam splitter 28 and the at least one second beam splitter 30 allows the at least one first beam splitter 28 and the at least one second beam splitter 30 to be positioned according to the position of the passenger 14 within the vehicle compartment 20, and according to the height of the passenger 14, ensuring that the system 10 can be customized to accommodate passengers of different size and seating position/orientation preferences. In addition, adjustability of the orientation of the at least one first beam splitter 28 and the at least one second beam splitter 30 allows the perceived location of the floating image 12 to be adjusted according to the passenger's preferences.

In one exemplary embodiment, the plurality of three-dimensional images includes a plurality of three-dimensional images of the same three-dimensional object, each three-dimensional image being a different perspective of the three-dimensional object, wherein each passenger 14 perceives a different perspective of the same three-dimensional object.

In another exemplary embodiment, each of the plurality of three-dimensional images is a three-dimensional image of a different three-dimensional object, wherein each passenger 14 perceives a different three-dimensional object. This allows the system 10 to present the same floating image 12 to all the passengers 14 so they can view simultaneously, or alternatively, each passenger can view a completely different three-dimensional image.

Figure 9:
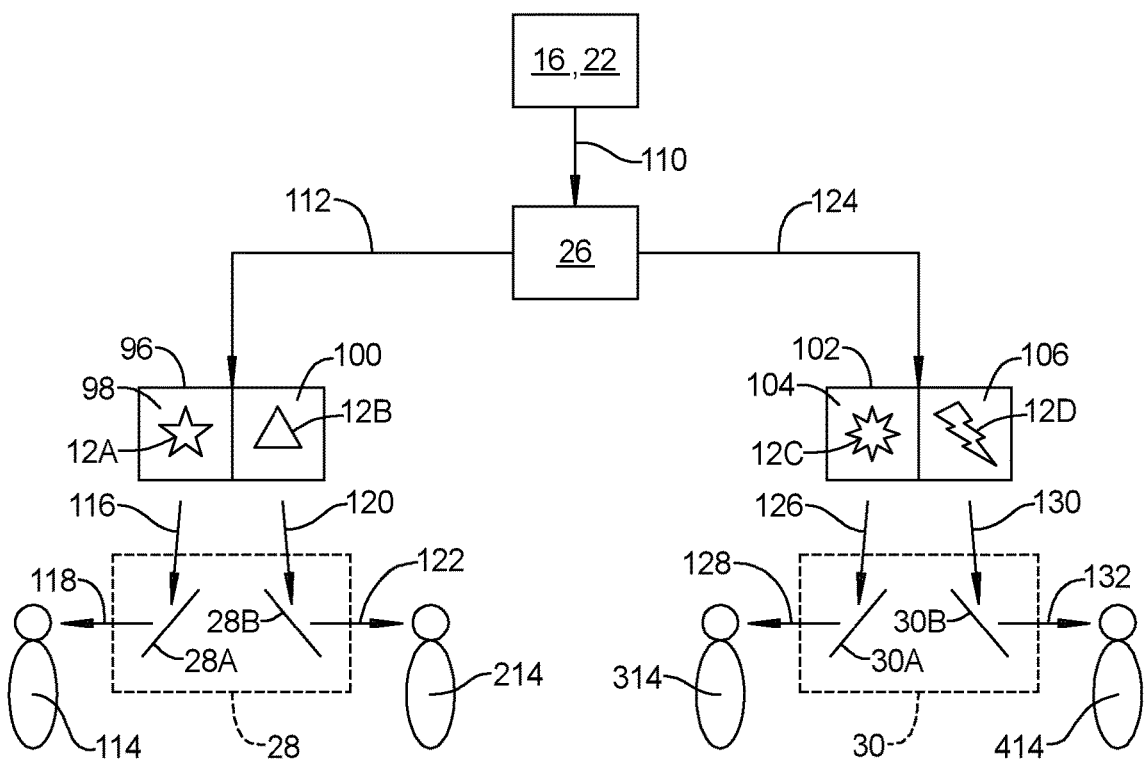
FIG. 9 is a schematic diagram of a system wherein a first image includes first and second sub-image regions and a second image includes third and fourth sub-image regions.
Figure 10:
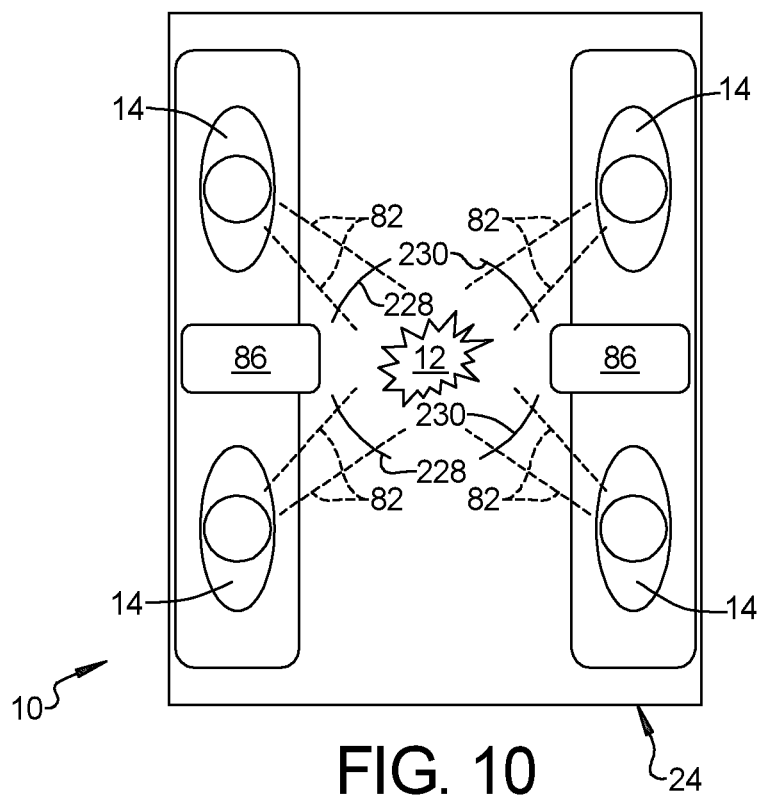
FIG. 10 is a schematic top view of a vehicle compartment having a system in accordance with an exemplary embodiment of the present disclosure, wherein the beam splitters have a curved profile.

Referring to FIG. 9, in still another exemplary embodiment, a first image 96 includes a first sub-image region 98 and a second sub-image region 100, and a second image 102 includes a third sub-image region 104 and a fourth sub-image region 106. The first and second images 96, 102 are projected by the display 16 to the polarization rotator 22, and to the reflector unit 26, as indicated by arrow 110.

The first image 96 is reflected by the reflector unit 26 to the at least one first beam splitter 28, as indicated by arrow 112. As shown, the at least one first beam splitter 28 includes a plurality of two first beam splitters 28. A first portion 28A of the plurality of first beam splitters 28 is aligned with the first sub-image region 98 of the first image 96, and reflects a first sub-image 12A to passengers 14 associated with the first portion 28A of the plurality of first beam splitters 28. A second portion 28B of the plurality of first beam splitters 28 is aligned with the second sub-image region 100 of the first image 96 and reflects a second sub-image 12B to passengers 14 associated with the second portion 28B of the plurality of first beam splitters 28. As shown, the plurality of first beam splitters 28 includes two first beam splitters 28, and each of the first and second portions 28A, 28B of the plurality of first beam splitters 28 includes a single first beam splitter 28. The first beam splitter 28 of the first portion 28A of the plurality of first beam splitters 28 reflects the first sub-image 12A to a first passenger 114, as indicated by arrows 116 and 118. The first beam splitter 28 of the second portion 28B of the plurality of first beam splitters 28 reflects the second sub-image 12B to a second passenger 214, as indicated by arrows 120 and 122.

The second image 102 is reflected by the reflector unit 26 to the at least one second beam splitter 30, as indicated by arrow 124. The at least one second beam splitter 30 includes a plurality of second beam splitters 30. A first portion 30A of the plurality of second beam splitters 30 is aligned with the third sub-image region 104 of the second image 102, and reflects a third sub-image 12C to passengers 14 associated with the first portion 30A of the plurality of second beam splitters 30. A second portion 30B of the plurality of second beam splitters 30 is aligned with the fourth sub-image region 106 of the second image 102 and reflects a fourth sub-image 12D to passengers 14 associated with the second portion 30B of the plurality of second beam splitters 30. As shown, the plurality of second beam splitters 30 includes two second beam splitters 30, and each of the first and second portions 30A, 30B of the plurality of second beam splitters 30 includes a single second beam splitter 30. The second beam splitter 30 of the first portion 30A of the plurality of second beam splitters 30 reflects the third sub-image 12C to a third passenger 314, as indicated by arrows 126 and 128. The second beam splitter 30 of the second portion 30B of the plurality of second beam splitters 30 reflects the fourth sub-image 12D to a fourth passenger 414, as indicated by arrows 130 and 132.

Referring again to FIG. 1, in an exemplary embodiment the at least one first beam splitter 28 and the at least one second beam splitter 30 each have a flat profile. Referring to FIG. 6, in another exemplary embodiment, each of the at least one first beam splitter 228 and the at least one second beam splitter 230 has a curved profile. Depending on the nature of the display 16, and the desired characteristics of the floating image 12, beam splitters 228 having a flat profile or beam splitters 230 having a curved profile can be utilized. Further, the curvature of a curved beam splitter 228, 230 can be varied to further adjust the characteristics of the displayed floating image 12.

A system of the present disclosure offers several advantages. These include providing a floating image that is perceived by the passengers at a centrally location position within the vehicle compartment. This provides a camp-fire like viewing atmosphere where the passengers can all view a common floating image, or each passenger can view a unique floating image.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for generating a centrally located floating three-dimensional image display for a plurality of passengers positioned within a vehicle, comprising:

a display adapted to project a multiplexed image comprising a plurality of three-dimensional images;
a polarization rotator positioned immediately in front of the display, the polarization rotator selectably actuatable to rotate the polarization of an image projected from the display through the polarization rotator to one of S-polarization and P-polarization;
a reflector unit adapted to reflect S-polarized images to at least one first beam splitter, and further adapted to reflect P-polarized images to at least one second beam splitter, each of the at least one first beam splitter and the at least one second beam splitter individually associated with one of the plurality of passengers, and adapted to receive one of the plurality of images from the display and to reflect the one of the plurality of images to the associated one of the plurality of passengers, wherein, each of the plurality of passengers perceives one of the plurality of three-dimensional images floating at a central location within the vehicle; and
a controller in communication with the display and the polarization rotator, the controller adapted to simultaneously:
actuate the display to alternate between projecting a first image and projecting a second image;
actuate the polarization rotator to alternate the polarization of the image projected from the display between S-polarization and P-polarization; and
synchronize the display and the polarization rotator such that:
when the display is projecting the first image, the polarization rotator rotates the polarization of the first image to S-polarization; and
when the display is projecting the second image, the polarization rotator rotates the polarization of the second image to P-polarization.

2. The system of claim 1, wherein the plurality of three-dimensional images are generated via a holographic method, pre-computed and encoded into a hologram generator within the display.

3. The system of claim 2, wherein the reflector unit includes a polarized beam splitter immediately downstream of the polarization rotator, the polarized beam splitter adapted to reflect S-polarized images to the at least one first beam splitter and to allow P-polarized images to pass through the polarized beam splitter.

4. The system of claim 3, wherein the reflector unit includes a first mirror immediately downstream of the polarized beam splitter, the first mirror adapted to reflect P-polarized images that pass through the polarized beam splitter to the at least one second beam splitter.

5. The system of claim 4, wherein the first mirror includes a filter adapted to rotate the polarization of the second image to S-polarization.

6. The system of claim 5, further including a second mirror positioned between the polarized beam splitter and the at least one first beam splitter and adapted to reflect the first image from the polarized beam splitter to the at least one first beam splitter.

7. The system of claim 6, further including a third mirror positioned between the first mirror and the at least one second beam splitter and adapted to reflect the second image from the first mirror to the at least one second beam splitter.

8. The system of claim 7, wherein the first image includes a first sub-image region and a second sub-image region and the at least one first beam splitter includes a plurality of first beam splitters, wherein a first portion of the plurality of first beam splitters are aligned with the first sub-image region of the first image and reflect a first sub-image to passengers associated with the first portion of the plurality of first beam splitters, and a second portion of the plurality of first beam splitters are aligned with the second sub-image region of the first image and reflect a second sub-image to passengers associated with the second portion of the plurality of first beam splitters.

9. The system of claim 8, wherein the second image includes a third sub-image region and a fourth sub-image region and the at least one second beam splitter includes a plurality of second beam splitters, wherein a first portion of the plurality of second beam splitters are aligned with the third sub-image region of the second image and reflect a third sub-image to passengers associated with the first portion of the plurality of second beam splitters, and a second portion of the plurality of second beam splitters are aligned with the fourth sub-image region of the second image and reflect a fourth sub-image to passengers associated with the second portion of the plurality of second beam splitters.

10. The system of claim 7, wherein the display and the reflector unit are mounted to a roof within the vehicle.

11. The system of claim 10, wherein each of the at least one first beam splitter and the at least one second beam splitter is transparent, wherein a passenger can see through each of the at least one first beam splitter and the at least one second beam splitter.

12. The system of claim 11, wherein each of the at least one first beam splitter and the at least one second beam splitter hangs from a roof of the vehicle.

13. The system of claim 11, wherein each of the at least one first beam splitter and the at least one second beam splitter is supported from a floor of the vehicle.

14. The system of claim 11, wherein each of the at least one first beam splitter and the at least one second beam splitter is supported from an armrest within the vehicle.

15. The system of claim 11, wherein an orientation of each of the at least one first beam splitter and the at least one second beam splitter is fixed.

16. The system of claim 11, wherein an orientation of each of the at least one first beam splitter and the at least one second beam splitter is adjustable.

17. The system of claim 11, wherein each of the at least one first beam splitter and the at least one second beam splitter has a flat profile.

18. The system of claim 11, wherein each of the at least one first beam splitter and the at least one second beam splitter has a curved profile.

19. A system for generating a centrally located floating three-dimensional image display for a plurality of passengers positioned within a vehicle, comprising:
a display mounted to a roof within the vehicle and adapted to project a multiplexed image comprising a plurality of three-dimensional images;
a polarization rotator positioned immediately in front of the display, the polarization rotator selectably actuatable to rotate a polarization of an image projected from the display through the polarization rotator to one of S-polarization and P-polarization;
a reflector unit mounted to the roof within the vehicle and including:
a polarized beam splitter immediately downstream of the polarization rotator, the polarized beam splitter adapted to reflect S-polarized images to at least one transparent first beam splitter and to allow P-polarized image to pass through the polarized beam splitter; and a first mirror immediately downstream of the polarized beam splitter, the first mirror adapted to reflect P-polarized images that pass through the polarized beam splitter to at least one transparent second beam splitter, the first mirror including a filter adapted to rotate the polarization of the second image to S-polarization;

wherein, each of the at least one first beam splitter and the at least one second beam splitter individually associated with one of the plurality of passengers, and adapted to receive one of the plurality of images from the display and to reflect the one of the plurality of images to the associated one of the plurality of passengers, wherein, each of the plurality of passengers perceives one of the plurality of three-dimensional images floating at a central location within the vehicle;

a second mirror positioned between the polarized beam splitter and the at least one first beam splitter and adapted to reflect the first image from the polarized beam splitter to the at least one first beam splitter;

a third mirror positioned between the first mirror and the at least one second beam splitter and adapted to reflect the second image from the first mirror to the at least one second beam splitter; and a controller in communication with the display and the polarization rotator, the controller adapted to simultaneously:

actuate the display to alternate between projecting a first image and projecting a second image;

actuate the polarization rotator to alternate the polarization of the image projected from the display through the polarization rotator between S-polarization and P-polarization; and synchronize the display and the polarization rotator such that:

when the display is projecting the first image, the polarization rotator rotates the polarization of the first image to 5-polarization; and when the display is projecting the second image, the polarization rotator rotates the polarization of the second image to P-polarization.

20. The system of claim 19, wherein the first image includes a first sub-image region and a second sub-image region and the at least one first beam splitter includes a plurality of first beam splitters, wherein a first portion of the plurality of first beam splitters are aligned with the first sub-image region of the first image and reflect a first sub-image to passengers associated with the first portion of the plurality of first beam splitters, and a second portion of the plurality of first beam splitters are aligned with the second sub-image region of the first image and reflect a second sub-image to passengers associated with the second portion of the plurality of first beam splitters, and the second image includes a third sub-image region and a fourth sub-image region and the at least one second beam splitter includes a plurality of second beam splitters, wherein a first portion of the plurality of second beam splitters are aligned with the third sub-image region of the second image and reflect a third sub-image to passengers associated with the first portion of the plurality of second beam splitters, and a second portion of the plurality of second beam splitters are aligned with the fourth sub-image region of the second image and reflect a fourth sub-image to passengers associated with the second portion of the plurality of second beam splitters.

* * * * *